United States Patent
Böing et al.

(10) Patent No.: US 9,051,922 B2
(45) Date of Patent: Jun. 9, 2015

(54) DRIVE SYSTEM FOR A WIND TURBINE

(75) Inventors: Alfons Böing, Bocholt (DE); Ralf Martin Dinter, Gelsenkirchen (DE); Jürgen Draber, Passau (DE); Arno Klein-Hitpass, Aachen (DE); Frank Kretschmann, Herten (DE); Jan-Dirk Reimers, Aachen (DE); Friedrich Schöberl, Ruhstorf a.d. Rott (DE); Roland Zeichfüssl, Ruhstorf a.d. Rott (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 0 days.

(21) Appl. No.: 14/347,176

(22) PCT Filed: Aug. 30, 2012

(86) PCT No.: PCT/EP2012/066864
§ 371 (c)(1),
(2), (4) Date: Jun. 23, 2014

(87) PCT Pub. No.: WO2013/045199
PCT Pub. Date: Apr. 4, 2013

(65) Prior Publication Data
US 2014/0302957 A1    Oct. 9, 2014

(30) Foreign Application Priority Data
Sep. 26, 2011  (EP) ..................................... 11182708

(51) Int. Cl.
*F16H 48/06* (2006.01)
*F03D 11/02* (2006.01)
(Continued)

(52) U.S. Cl.
CPC . *F03D 11/02* (2013.01); *F16H 1/28* (2013.01); *F05B 2260/40311* (2013.01); *F03D 11/04* (2013.01); *F05B 2260/30* (2013.01); *Y02E 10/728* (2013.01); *F16H 57/021* (2013.01); *F16H 2057/02078* (2013.01); *H02K 7/116* (2013.01); *H02K 7/1838* (2013.01); *Y02E 10/725* (2013.01)

(58) Field of Classification Search
None
See application file for complete search history.

(56) References Cited

U.S. PATENT DOCUMENTS 4,590,820 A * 5/1986 Hambric ........................ 74/640
5,663,600 A * 9/1997 Baek et al. ..................... 290/55
(Continued)

FOREIGN PATENT DOCUMENTS

| CN | 201367991 Y | 12/2009 |
| EP | 1 045 139 | 10/2000 |

(Continued)

*Primary Examiner* — Dirk Wright
(74) *Attorney, Agent, or Firm* — Henry M. Feiereisen LLC

(57) ABSTRACT

A drive system having an integrated transmission and motor/generator unit for a wind turbine includes a transmission output shaft designed as a hollow shaft, which receives a sun shaft of an output-side planetary gear stage and is connected thereto. The transmission output shaft comprises a transmission-side end section of an insert shaft which is concentrically arranged within a rotor hollow shaft. The transmission output shaft additionally has a bearing for receiving radial and axial forces. The motor/generator unit has two dedicated bearings. One bearing thereof is a transmission-side bearing. In addition, a rear-side generator bearing is provided.

31 Claims, 6 Drawing Sheets

(51) Int. Cl.
    *F03D 11/04*    (2006.01)
    *H02K 7/116*    (2006.01)
    *H02K 7/18*     (2006.01)
    *F16H 1/28*         (2006.01)
    *F16H 57/021*       (2012.01)
    *F16H 57/02*        (2012.01)

(56) References Cited

U.S. PATENT DOCUMENTS

| | | | |
|---|---|---|---|
| 6,232,673 B1 | 5/2001 | Schoo et al. | |
| 7,008,348 B2* | 3/2006 | LaBath | 475/338 |
| 7,621,843 B2* | 11/2009 | Madge et al. | 475/346 |
| 8,075,442 B2* | 12/2011 | Ciszak et al. | 475/331 |
| 8,128,525 B2* | 3/2012 | Dinter et al. | 475/159 |
| 8,358,029 B2* | 1/2013 | Burkart | 290/55 |
| 8,365,866 B2* | 2/2013 | Ciszak et al. | 184/6.12 |
| 8,378,536 B2 | 2/2013 | Pötter et al. | |
| 8,529,391 B2* | 9/2013 | Degeling et al. | 475/159 |
| 8,591,368 B2* | 11/2013 | Dinter et al. | 475/149 |
| 8,632,437 B2 | 1/2014 | Dinter et al. | |
| 8,784,252 B2* | 7/2014 | Dinter et al. | 475/149 |
| 2010/0230520 A1 | 9/2010 | Brammer et al. | |
| 2013/0095972 A1* | 4/2013 | Dinter et al. | 475/149 |

FOREIGN PATENT DOCUMENTS

| | | |
|---|---|---|
| EP | 2031273 A2 | 3/2009 |
| EP | 2 295 147 | 3/2011 |
| EP | 2 508 754 | 10/2012 |
| EP | 2 541 058 | 1/2013 |
| WO | WO 2006053940 A1 | 5/2006 |
| WO | WO 2006/031694 | 3/2008 |

* cited by examiner

DRIVE SYSTEM FOR A WIND TURBINE

CROSS-REFERENCES TO RELATED APPLICATIONS

This application is the U.S. National Stage of International Application No. PCT/EP2012/066864, filed Aug. 30, 2012, which designated the United States and has been published as International Publication No. WO 2013/045199 and which claims the priority of European Patent Application, Serial No. 11182708.5, filed Sep. 26, 2011, pursuant to 35 U.S.C. 119(a)-(d).

BACKGROUND OF THE INVENTION

A large-scale machine drive train for wind turbines or windmills conventionally comprises system components such as grid connection elements, motors or generators, couplings, transmissions and drive shafts. On the grid side, converters are often provided. Brake systems in the form of mechanical brakes on fast-running shafts between the transmission and the motor or generator are often provided since braking torques are smaller there due to transmission ratio.

From EP 1 045 139 A2, there is known a wind turbine with a rotor, the rotor hub of which is mounted in a roller bearing arranged on a rotor support and which is connected to a two-stage planetary gear transmission having an input stage and an output stage. An output shaft of the planetary stage is coupled by means of a coupling to a generator. An inner ring of the roller bearing is releasably connected to the rotor hub and rotating parts of the planetary transmission. Furthermore, a housing of the generator is releasably connected with the planetary transmission to a drive train module. The drive train module is supported on the rotor support and is therefore dynamically decoupled.

From EP 2 031 273 A2, there is known a generator-transmission unit wherein a rotor of the generator is mounted by means of a bearing arrangement provided between an inner rotor hollow shaft and a housing connecting piece. Coil and magnet arrangements of the rotor surround the housing connecting piece radially. A coupling is provided between the inner rotor shaft and a sun shaft. The sun shaft has no bearing of its own, but is mounted by means of the rotor bearing arrangement.

From WO 2008/031694 A1 is known a mill drive system with a transmission which can be arranged beneath a grinding plate. The transmission comprises at least one planetary gear stage and has a vertical shaft position. An electric motor which is connected to a lubricant supply circuit of the transmission is integrated into a housing of the transmission, the rotor and stator of said motor having vertically arranged axes and the cooling of said motor being achieved by means of lubricant circulating through the transmission.

SUMMARY OF THE INVENTION

It is an object of the present invention to provide a drive system for a wind turbine which enables a compact construction even with separate bearings for the transmission and for the motor or generator unit.

The object is achieved according to the invention by a drive system which comprises a transmission unit with at least one planetary gear stage which comprises an internal gear wheel, a plurality of planetary gears, a planet support and a sun wheel. Furthermore, a first shaft is associated with the transmission unit, said shaft comprising a coupling flange, which is connectable to a driven machine shaft or a rotor shaft, and being mounted by means of the planet support. A motor unit or a generator unit is connected to the transmission unit. Furthermore, associated with the transmission unit is a second shaft configured as a hollow shaft, which with the transmission-side end section thereof concentrically surrounds a motor-side or generator-side end section of a sun wheel shaft and there is non-rotatably connected thereto. A rotor of the motor or generator unit is non-rotatably connected to a rotor hollow shaft. Also non-rotatably connected to the rotor hollow shaft is a stub shaft, the transmission-side end section of which is concentrically surrounded by the second shaft of the transmission unit and there is non-rotatably connected thereto. Arranged between the transmission unit and the motor or generator unit is a transmission housing connecting piece which concentrically surrounds the second shaft of the transmission unit and provides a bearing seating for a bearing arrangement associated with the second shaft and by means of which the sun wheel shaft is also mounted. Two housing covers each arranged on a motor end face or a generator end face provide bearing seatings for a first and second bearing of the rotor hollow shaft.

Advantageous developments of the present invention are disclosed in the dependent claims.

The stub shaft arranged concentrically within the second shaft of the transmission unit and the rotor hollow shaft enables a compact design with independent mounting of the motor unit or generator unit. As a result, the motor or generator unit can be operated autonomously.

A particularly compact design results if, according to an advantageous development of the present invention, the second shaft of the transmission unit is connected to the sun wheel shaft by means of a coupling or a clamping connection arranged within the second shaft. In corresponding manner, the second shaft of the transmission unit can be connected to the stub shaft by means of a coupling or clamping connection arranged within the second shaft. In advantageous manner, the rotor hollow shaft can also be connected to the stub shaft at a transmission-side end of the rotor hollow shaft by means of a coupling or clamping connection arranged within the rotor hollow shaft.

According to an advantageous development of the present invention, the stub shaft extends axially entirely beyond the rotor hollow shaft and is connected to the rotor hollow shaft by means of a coupling or clamping connection at an end side of the motor or generator unit facing away from the transmission unit. This enables the motor or generator unit to be effectively decoupled from external axial loads.

The rotor hollow shaft can also be non-rotatably connected, at an end side of the motor or generator unit facing away from the transmission unit, to a brake disk of a braking device. The inner stub shaft and an outer brake disk flange can cooperate in advantageous manner such that joint forces which arise due to the type of connection and the operational forces can be mutually compensated for, depending on position. This, in turn, leads to a raised joint pressure.

According to a further embodiment of the present invention, the second shaft of the transmission unit is non-rotatably connected to a brake disk of a braking device. In this case, the brake disk can be connected to the second shaft by means of a keyed or clamping connection. The keyed or clamping connection is advantageously axially aligned with a short toothed coupling between the second shaft and the sun wheel shaft. This enables expansion of the second shaft by the short toothed coupling on the sun wheel shaft to be used to ensure sufficient joint pressure in the keyed or clamping connection on the brake disk. This facilitates both the design and the assembly and disassembly. Furthermore, an axially central arrangement of the braking device enables a reduced structural length as well as easy exchange of a rear-side rotor shaft bearing.

The second shaft of the transmission unit is preferably mounted by means of a double-row mounting in an X arrangement. This facilitates complete generator-side bearing removal and easy bearing adjustment via a rear-side bearing cover.

According to a particularly preferred development of the present invention, the coupling flange can be elastically connected to the driven machine shaft or the rotor shaft. In this way, a cardanic coupling of a driven machine or a rotor shaft is possible, particularly with an angular offset. A coupling of this type can be realized with, for example, elastic bolts. Furthermore, the transmission housing comprises a cardanic peripherally symmetrical or partially symmetrical mounting for connecting to a supporting structural element of the wind turbine. The supporting structural element can be, for example, a base bearing with a connection to a frame or a gondola of the wind turbine. By means of a double cardanic or full-cardanic mounting of the drive system within the supporting structural element and with a cardanic connection of the coupling flange, bearing-damaging or toothing-damaging influences can be prevented. Displacements in base supports arising from deformations of the main frame of a wind turbine system, which according to conventional solutions are coupled into the drive train via the mounting of the drive train therefore do not lead to undesirable constraining forces, but are prevented by the cardanic mounting. The drive system is therefore subjected only to torsional loading.

When the drive system according to the invention is used in a wind turbine, the transmission unit is connected to a generator unit. Furthermore, the first shaft of the transmission unit is a transmission-side drive shaft in this case. The second shaft of the generator unit, however, is a transmission-side output shaft. On use of the drive system according to the invention in a wind turbine, the coupling flange of the transmission-side drive shaft can be connected to a rotor shaft.

BRIEF DESCRIPTION OF THE DRAWING

The present invention will now be described in greater detail making reference to an exemplary embodiment illustrated in the drawings, in which.

DETAILED DESCRIPTION OF PREFERRED EMBODIMENTS

Figure 1:
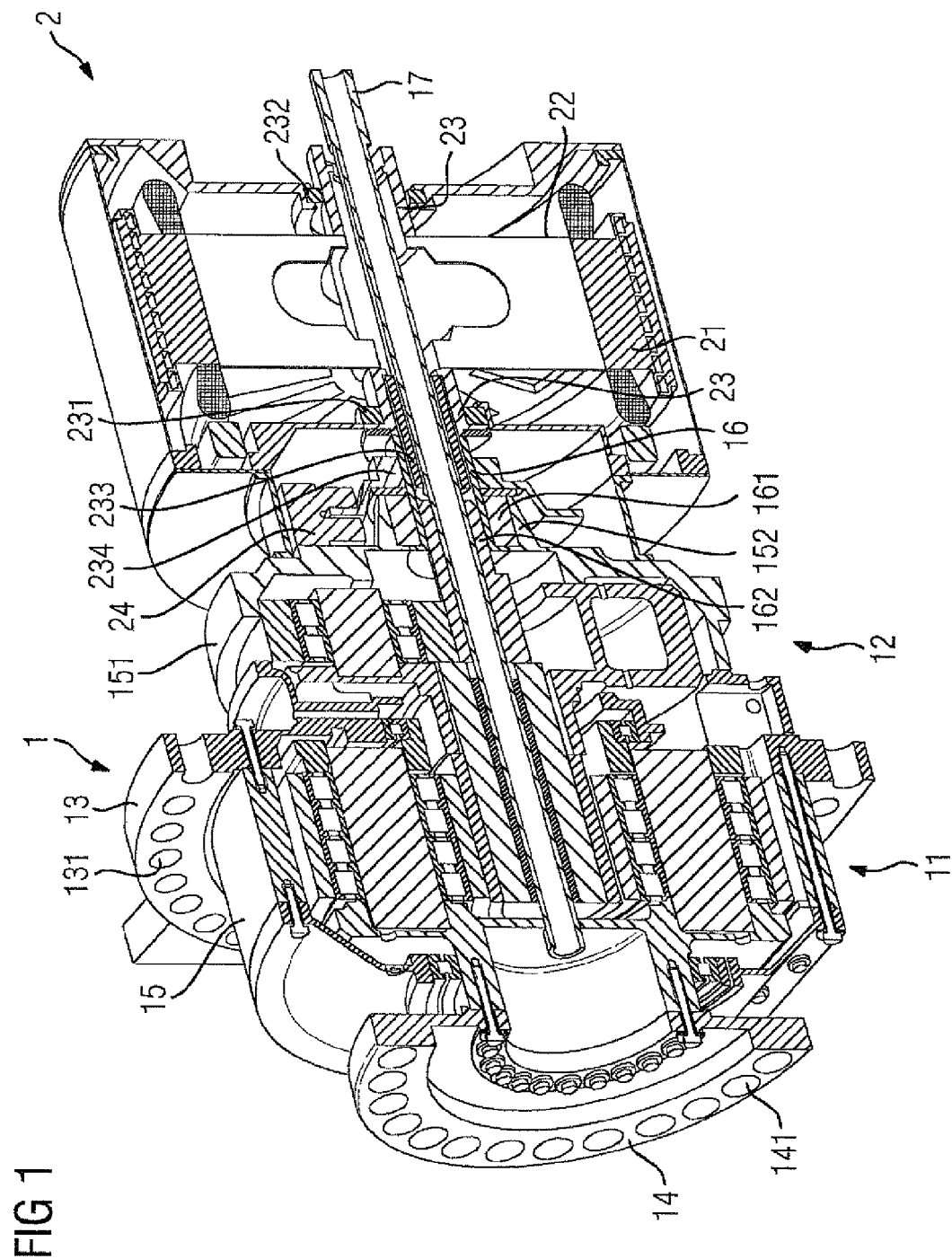
FIG. 1 is a perspective sectional view of a variant of a drive system for a wind turbine with a short stub shaft.

The drive system for a wind turbine shown in FIG. 1 has a transmission unit 1 with a first 11 and a second planetary gear stage 12 in a coaxial construction. As the sectional representation of FIG. 2 shows, each planetary gear stage 11, 12 comprises an internal gear wheel 114, 124, a plurality of planetary gears 113, 123, a planet support 112, 122 and a sun gear 111, 121.

The transmission unit 1 is connected via an output shaft 16, configured as a hollow shaft, of the transmission unit 1 to a generator unit 2 and is arranged in a transmission housing 15. The output shaft 16 surrounds, with the transmission-side end section thereof, a generator-side end section of a sun wheel shaft 162 of the second planetary gear stage 12 concentrically and there is non-rotatably connected thereto. The output shaft 16 and the sun wheel shaft 162 are connected to one another by means, for example, of a coupling or a clamping connection arranged within the output shaft 16. This can take place, in particular, by means of a short toothed coupling, spiral toothing, a polygonal connection, a keyed connection, an elastic bolt coupling or an internal clamping set.

The generator unit 2 comprises a stator 21 and a rotor 22 which is non-rotatably connected to a rotor hollow shaft 23. The rotor hollow shaft 23 is arranged axially spaced from the output shaft 16 of the transmission unit 1 or adjoins axially thereto. The rotor hollow shaft 23 is also non-rotatably connected to a stub shaft 233 which is concentrically surrounded at the transmission-side end section thereof by the output shaft 16 of the transmission unit 1 and there is non-rotatably connected thereto. The output shaft 16 and the stub shaft 233 are connected to one another by means, for example, of a coupling or a clamping connection arranged within the output shaft 16. This can take place, in particular, by means of a short toothed coupling, spiral toothing, a polygonal connection, a keyed connection, an elastic bolt coupling or an internal clamping set.

Figure 2:
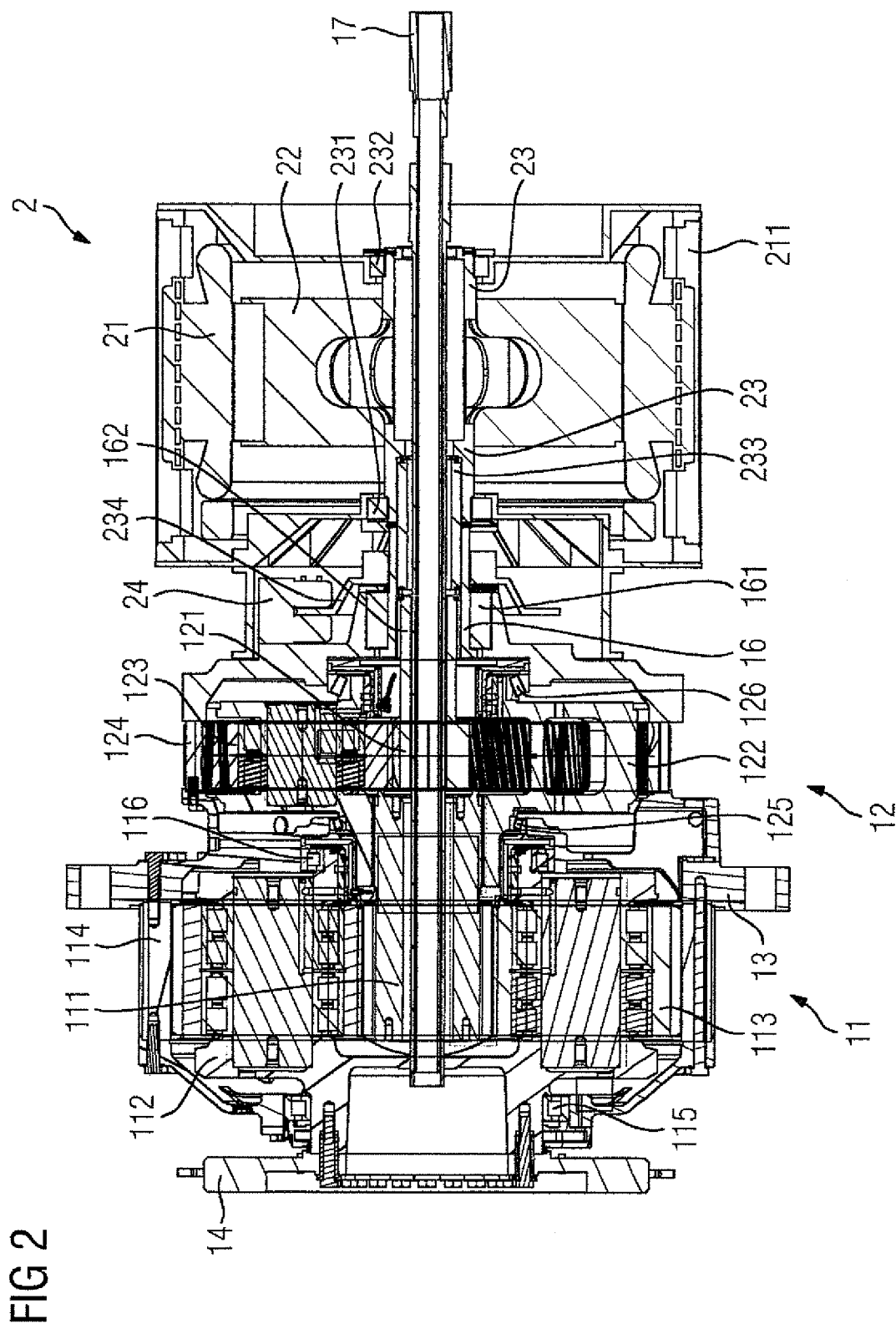
FIG. 2 is a sectional view of the drive system of FIG. 1 with a transmission unit and a generator unit.

In the variant of a drive system illustrated in FIGS. 1 and 2 with a short stub shaft, the rotor hollow shaft 23 is connected to the stub shaft 233 at a transmission-side end of the rotor hollow shaft 23 by means of a coupling or a clamping connection arranged within the rotor hollow shaft 23. In this case also, this can be achieved by means of a short toothed coupling, spiral toothing, a polygonal connection, a keyed connection, an elastic bolt coupling or an internal clamping set.

Figure 3:
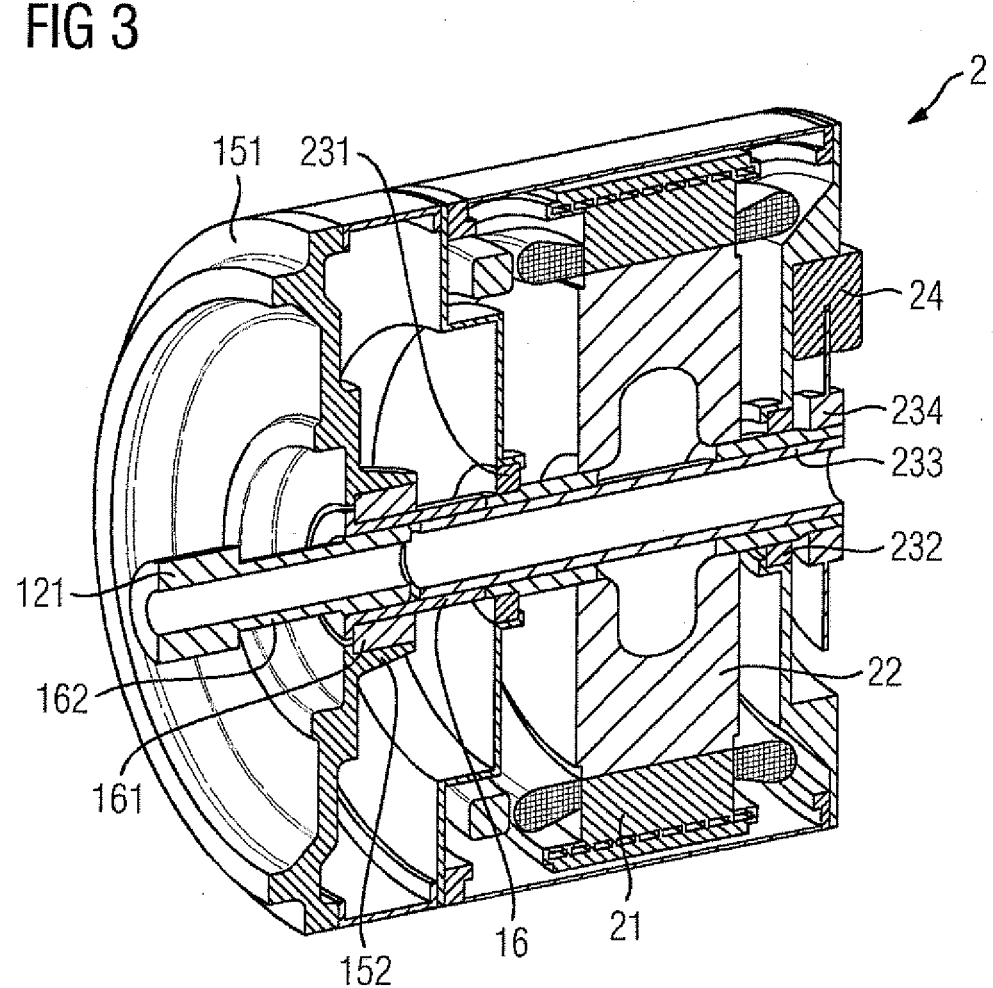
FIG. 3 is a perspective sectional view of a generator unit of a variant of a drive system for a wind turbine with a continuous stub shaft.

According to the variant of a drive system with a continuous stub shaft as illustrated in FIG. 3, the stub shaft 233 extends axially entirely beyond the rotor hollow shaft 23 and is connected to the rotor hollow shaft 23 by means of a coupling or clamping connection at an end side of the generator unit 2 facing away from the transmission unit 1. A connection between the rotor hollow shaft 23 and the stub shaft 233 can be achieved by means of a short toothed coupling, spiral toothing, a polygonal connection, a keyed connection, a flange connection, an elastic bolt coupling or an internal or external clamping set.

In the variants of a drive system illustrated in FIGS. 1 to 3, a transmission housing connecting piece 152 which concentrically surrounds the output shaft 16 and forms a bearing seating for a bearing arrangement 161 associated with the output shaft 16 is arranged between the transmission unit 1 and the generator unit 2. The sun wheel shaft 162 is also mounted by means of this bearing arrangement 161. The transmission housing connecting piece 152 concentrically surrounds a generator-side end section of the sun wheel shaft 162. The bearing arrangement 161 of the output shaft 16 at the housing connecting piece 152 preferably comprises a double-row bearing in X arrangement. Arranged within the output shaft 16 and the rotor hollow shaft 23 in the present exemplary embodiment is a pitch tube 17 which extends axially beyond the whole of the drive system.

Two housing covers each arranged on a generator end face provide bearing seatings for a first bearing 231 and a second bearing 232 of the rotor hollow shaft 23. The bearing seating for the first bearing 231 of the rotor hollow shaft 23 is formed by a housing cover facing toward the transmission unit 1 at a first generator end side, whereas the bearing seating for the second bearing 232 of the rotor hollow shaft 23 is formed by a housing cover facing away from the transmission unit 1 at the second generator end side.

A drive shaft which is formed on the planet support 112 of the first planetary gear stage 11 and has a coupling flange 14 which can be connected to a rotor shaft and is mounted by means of the planet support 112 of the first planetary gear stage 11 is associated with the transmission unit 1. Two bearings 115 and 116 which represent a first and second main bearing of the transmission unit 1 and are arranged between the planet support cheeks and the transmission housing 15 are associated with the planet support 112 of the first planetary gear stage 11. Similarly, the planet support 122 of the second planetary gear stage 12 is mounted by means of two bearings 125 and 126 arranged between the planet support cheeks and the transmission housing 15.

In the variant of a drive system illustrated in FIGS. 1 and 2, the output shaft 16 of the transmission unit 1 is non-rotatably connected to a brake disk 234 of a braking device. A brake caliper 24 associated with a brake disk 234 is fastened, as shown in FIGS. 1 and 2 on a housing intermediate flange 151 arranged between the transmission unit 1 and the generator unit 2. The brake disk 234 can be connected, for example, by means of a keyed or clamping connection to the output shaft 16. Preferably, the keyed or clamping connection is axially aligned with a short toothed coupling between the output shaft 16 and the sun wheel shaft 162.

According to the variant of a drive system illustrated in FIG. 3, the rotor hollow shaft 23 is non-rotatably connected, on the second generator end side facing away from the transmission unit 1, to a brake disk 234 of a braking device. The brake disk 234 is thus readily accessible for maintenance purposes. As shown in FIG. 3, a brake caliper 24 associated with the brake disk 234 is fastened to a housing cover at the second generator end side. In the variant according to FIG. 3, the stub shaft 233 can also be connected to the second generator end side with a disk-shaped flange, which is fastened to the brake disk 234 with elastic bolts.

In principle, mixed forms of the variants shown in FIGS. 1 to 3 are also possible. For example, a continuous stub shaft can be combined with a centrally arranged braking device or a short stub shaft can be combined with a rear-side braking device.

In the present exemplary embodiment, the housing connecting piece 152 concentrically surrounding the bearing arrangement 161 of the output shaft 23 is formed onto the housing intermediate flange 151 arranged between the transmission unit 1 and the generator unit 2. Both a stator jacket 211 of the generator unit 2 and the internal gear wheel 124 of the second planetary gear stage 12 are mounted on the housing intermediate flange 151. In addition, the housing intermediate flange 151 has a bearing seating for a generator-side planet support bearing 126 of the second planetary gear stage 12.

Figure 4:
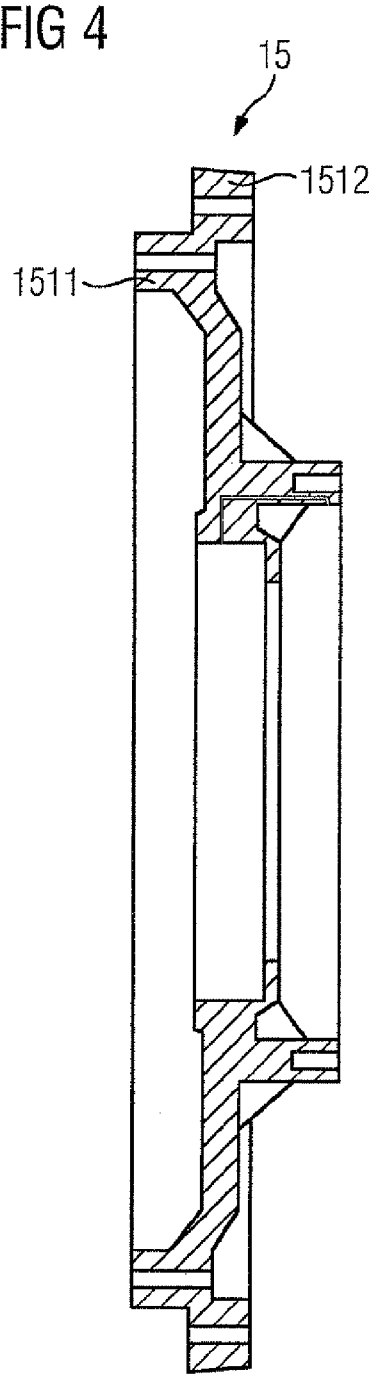
FIG. 4 is a sectional view of a first variant of a housing intermediate flange between the transmission unit and the generator unit.
Figure 5:
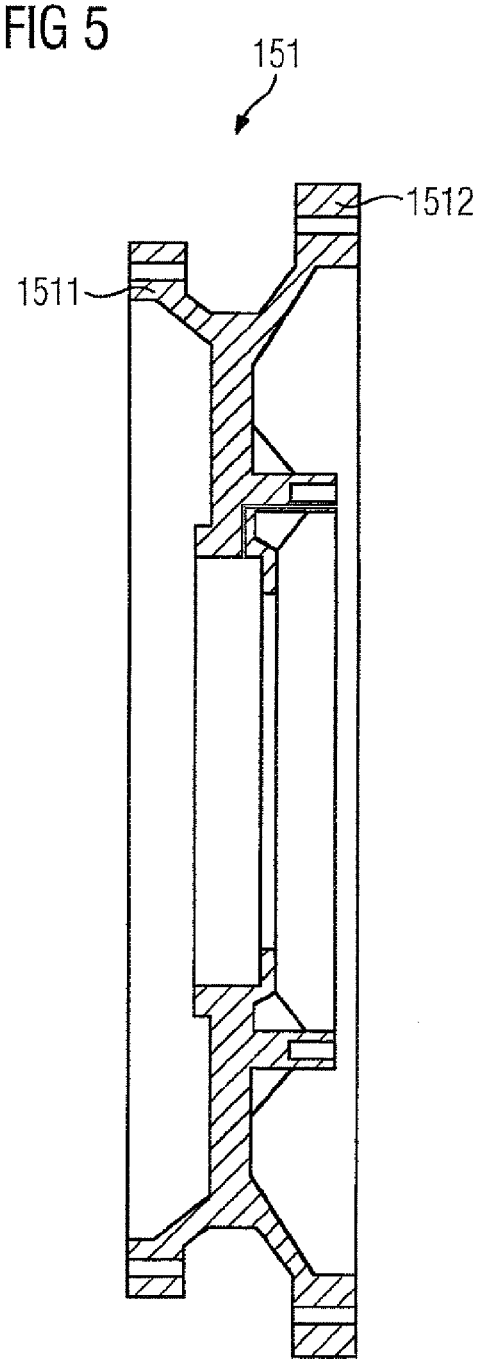
FIG. 5 is a sectional view of a second variant of a housing intermediate flange between the transmission unit and the generator unit.

As FIG. 4 shows, the housing intermediate flange 151 has, respectively, a flange projection 1511, 1512 on which the stator jacket 211 or the internal gear wheel 124 of the second planetary gear stage 12 is mounted. FIG. 5 shows a variant of a housing intermediate flange 151 in which the flange projection 1512 associated with the stator jacket 211 and the flange projection 1511 associated with the internal gear wheel 124 are spaced apart from one another axially.

The transmission housing 15 comprises a full cardanic peripherally symmetrical or partially symmetrical mounting 13 for connecting to a supporting structural element of the wind turbine. This supporting structural element is, for example, a frame or a gondola of the wind turbine.

The second planetary gear stage 12 is dimensioned with regard to the gearing thereof, such that on selection of a generator pole count which is divisible by 2—according to an advantageous embodiment, also divisible by 3—and on optimal configuration for the nominal rotary speed, an essentially identical external diameter of the stator of the generator unit 2 and of the internal gear wheel 124 of the second planetary gear stage 12 result. Generator-side bearings of the transmission unit 1 are configured electrically isolated. In this way, a current flow from the transmission unit 1 into a rotor of the generator unit 2 can be prevented.

As a result of the full cardanic mounting of the drive system in combination with a transverse and radial force freedom and a two-point or torque mounting of the drive system, a drive train is produced which is subject only to torsion. Through the bringing together, on the housing side, of the transmission unit 1 and the generator unit 2 while making use of the high stiffness thereof, despite the significantly less stiff support elements in the cardanic mounting, at least a marked reduction of constraining forces in the drive train can be achieved.

As a result of the combination of the two-point or torque mounting of the drive system with the full cardanic mounting of the transmission housing 15 which also comprises the generator unit 2, a coupling arranged between the transmission unit 1 and the generator unit 2 is subject to significantly reduced loading. This coupling can therefore be configured significantly stiffer. This, in turn, offers further advantages with regard to operating dynamics.

A design of the main bearing of the transmission unit 1 can be executed without taking account of supports for subsequent components. In this way, the use of torque mountings, which require only a significantly reduced structural space, for the main bearings of the transmission unit 1 in a technically achievable form for large-scale drives is possible. Furthermore, according to the invention, torsion-related shaft alignment twisting has been rendered harmless to the transmission unit 1 by the full cardanic mounting.

Figure 6:
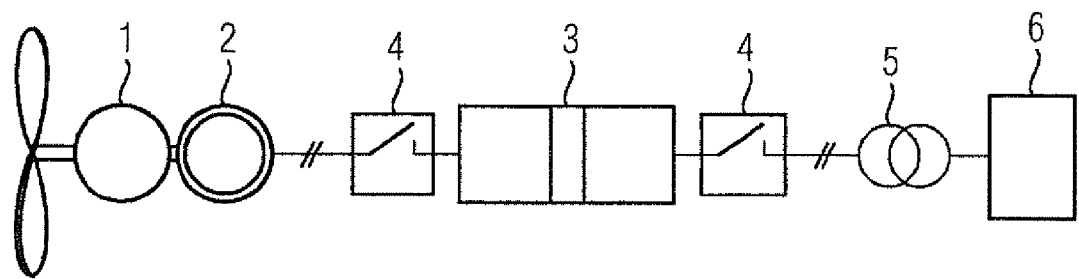
FIG. 6 is a schematic representation of a drive system for a wind turbine together with a grid connection.

In the present exemplary embodiment 3, the generator unit 2 has independent winding systems which are connected to a full converter 3 as shown in FIG. 6. The full converter 3 enables a network-dynamic decoupling and is connected via load-breaker switches 4 to the generator unit 2 on one side and, on the other side, to a transformer 5 for power infeed to an energy supply network 6. Furthermore, isolated generator windings are provided for each pole. In addition, the 3 independent winding systems are connected up outside the transmission housing 15 surrounding the generator unit 2. The generator unit is configured having in the range from 6 to 30 poles and preferably from 12 to 24 poles.

Figure 7:
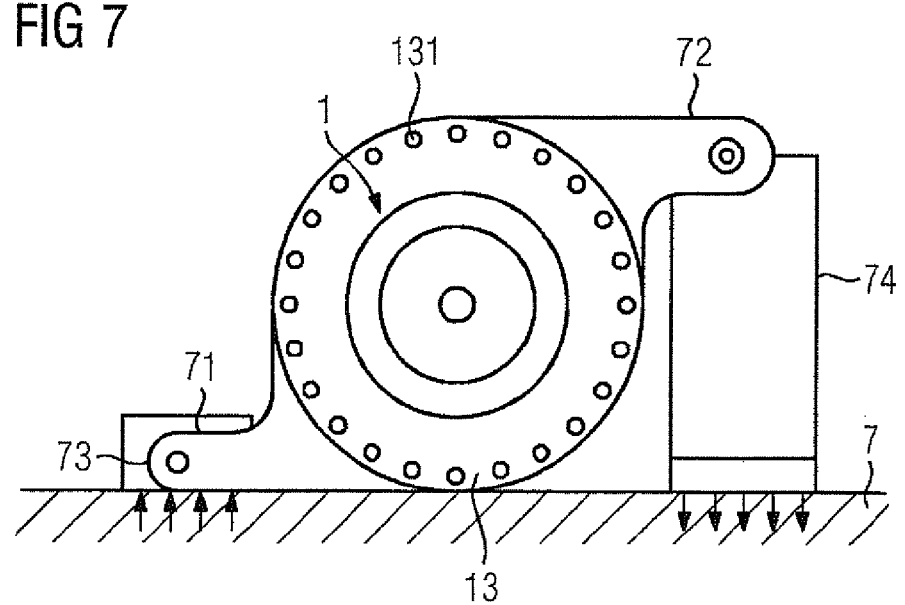
FIG. 7 is an illustration of a ring-shaped mount for full-cardanic mounting of the drive system of FIG. 1 with a corresponding two-armed torque mount.

According to the exemplary embodiment shown in FIG. 7, the full cardanic mounting 13 is formed by a ring-shaped mount radially surrounding the whole periphery of the transmission housing 15. The ring-shaped mount 13 has a plurality of bores 131 which are arranged in the peripheral direction substantially equidistantly and into which elastic bolts are each inserted with a first end section. The elastic bolts are connected to a corresponding torque mount on the supporting structural element 7 of the wind turbine. The corresponding torque mount also includes a ring element with bores which are arranged in the peripheral direction substantially equidistantly and into which the elastic bolts are each inserted with a second end section. Furthermore, the corresponding torque mount as per the exemplary embodiment of FIG. 7 has two asymmetrically formed mounting arms 71, 72 which are each connected by an end section into a receptacle 73, 74 on the supporting structural element 7 and there are connected thereto.

The elastic bolts of the full cardanic mounting 13 are axially removable elastomer bolts. As shown in FIG. 1, the coupling flange 14 also has a plurality of bores 141 which are arranged in the peripheral direction substantially equidistantly and into which the axially removable elastomer bolts, which are connected to a corresponding rotor shaft coupling flange are inserted. With the elastomer bolts of the full cardanic mounting 13 and the coupling flange 14 removed, a radial assembly and disassembly direction of the drive system is made free with regard to a shaft arrangement of the transmission unit 1.

Additional assemblies of the transmission unit 1, for example, an oil system, cooling and hydraulic systems are advantageously mounted directly onto the supporting structural element 7 of the wind turbine. By means of the full cardanic mounting 13 and an elastic coupling between the rotor shaft and the drive shaft of the transmission unit 1, the additional assemblies are thus decoupled from the transmission housing 15.

Figure 8:
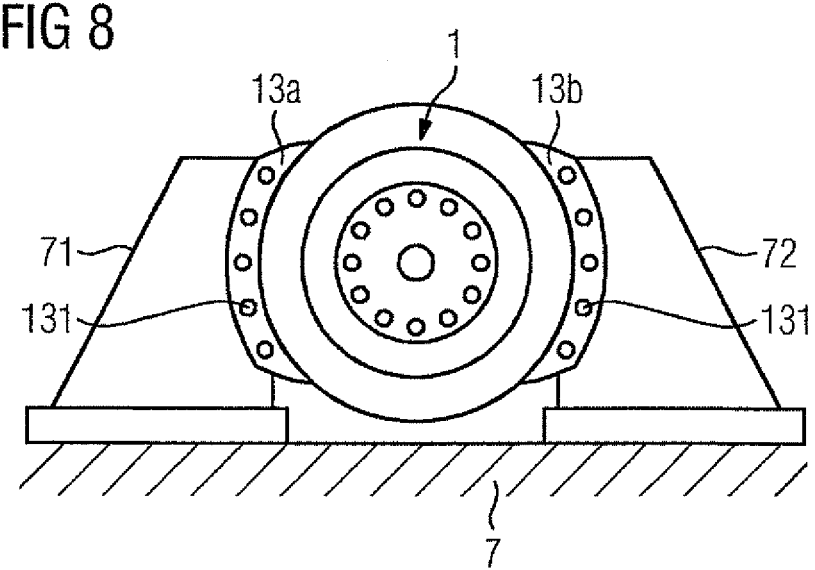
FIG. 8 is an illustration of two ring-shaped mounts for full-cardanic mounting of the drive system of FIG. 1 with a corresponding torque mount.
Figure 9:
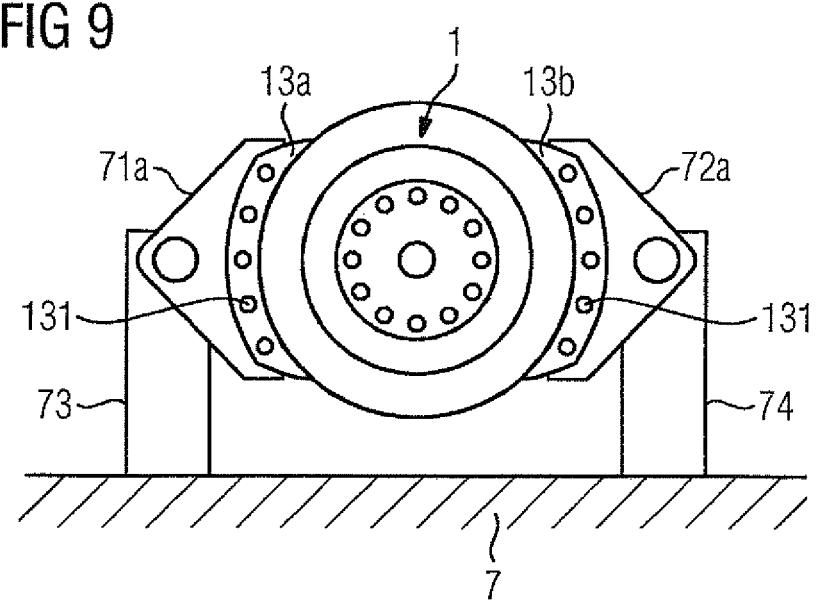
FIG. 9 is an illustration of two ring-shaped segment mounts in a variant derived from FIG. 8.

In FIGS. 8 and 9, in each case, two ring segment mounts 13a, 13b for partial peripheral full cardanic mounting of the drive system are shown. The ring-shaped mounts 13a, 13b each have a plurality of bores 131 which are arranged in the peripheral direction substantially equidistantly and into which elastic bolts are inserted. In addition, the elastic bolts are connected to corresponding torque mounts 71, 72 on the supporting structural element 7 of the wind turbine. As per the exemplary embodiment shown in FIG. 8, the corresponding torque mounts 71, 72 are fastened directly onto the supporting structural element 7 of the wind turbine. However, the corresponding torque mounts as per the exemplary embodiment of FIG. 9 each have a mounting arm 71a, 72a, each being connected by an end section into a receptacle 73, 74 on the supporting structural element and there are connected thereto. In this way, an inclusion capability as for a conventional two-arm mount is retained without any adaptation of the main frame to the wind turbine being required. Since freedom from constraining forces already exists, known elastomer supports which are preferably configured entirely according to vibration-damping criteria can be used.

In both the exemplary embodiment according to FIG. 8 and that according to FIG. 9, the corresponding torque mounts comprise a ring-shaped segment with bores 131 arranged substantially equidistantly in the peripheral direction, at the supporting structural element 7. The elastic bolts, which can be designed, as in the exemplary embodiment of FIG. 7, as axially removable elastomer bolts, are inserted into these bores 131. Preferably, the axis of symmetry of the torque mount and the rotation axes of the drive system intersect one another.

Furthermore, according to a further embodiment, the coupling flange can comprise a plurality of rows of bores which are offset relative to one another and into which axially removable elastomer bolts are inserted. In this way, the coupling flange can be configured smaller with regard to the external diameter thereof, but with the same bore separations.

Furthermore, the elastomer bolts can have different stiffness values, adapted according to the diameters and flange types thereof. In particular, the coupling flange with a smaller diameter relative to the mounting can be made from a relatively hard material, whereas the mounting can be made from a relatively soft material.

The use of the drive system described is not only restricted to wind turbines, but is conceivable also in, for example, mill drive systems in which the generator unit is replaced by a motor unit.

The invention claimed is:

1. A drive system for a wind turbine, comprising:
   a transmission unit comprising at least one planetary gear stage having an internal gear wheel, a plurality of planetary gears, a planet support, and a sun gear;
   a first shaft associated with the transmission unit, said shaft comprising a coupling flange which is connectable to a driven machine shaft or rotor shaft and is supported by the planet support;
   a motor unit or a generator unit connected to the transmission unit and having a rotor hollow shaft and a rotor which is non-rotatably connected to the rotor hollow shaft;
   a second shaft associated with the transmission unit and configured as a hollow shaft, said second shaft having a transmission-side end section in concentric surrounding relationship to a motor-side or generator-side end section of a sun wheel shaft and non-rotatably connected thereto;
   a stub shaft non-rotatably connected to the rotor hollow shaft and having a transmission-side end section which is concentrically surrounded by the second shaft of the transmission unit and non-rotatably connected thereto;
   a first bearing arrangement associated with the second shaft and configured to support the sun wheel shaft;
   a transmission housing connecting piece arranged between the transmission unit and the motor or generator unit in concentric surrounding relationship to the second shaft of the transmission unit, said transmission housing connecting piece providing a bearing seating for the bearing arrangement;
   a second bearing arrangement having first and second bearings to support the rotor hollow shaft; and
   two housing covers respectively arranged on a motor or generator end face for providing bearing seatings for the first and second bearings of the rotor hollow shaft.

2. The drive system of claim 1, further comprising a coupling or clamping connection arranged within the second shaft and configured to connect the second shaft of the transmission unit to the sun wheel shaft.

3. The drive system of claim 2, wherein the coupling or clamping connection is a member selected from the group consisting of a short toothed coupling, spiral toothing, a polygonal connection, a keyed connection, an elastic bolt coupling, and an internal clamping set.

4. The drive system of claim 1, further comprising a coupling or clamping connection arranged within the second shaft and configured to connect the second shaft of the transmission unit to the stub shaft.

5. The drive system of claim 4, wherein the coupling or clamping connection is a member selected from the group consisting of a short toothed coupling, spiral toothing, a keyed connection, an elastic bolt coupling, and an internal clamping set.

6. The drive system of claim 1, further comprising a coupling or clamping connection arranged within the rotor hollow shaft and configured to connect the rotor hollow shaft to the stub shaft at a transmission-side end of the rotor hollow shaft.

7. The drive system of claim 6, wherein the coupling or clamping connection is a member selected from the group consisting of a short toothed coupling, spiral toothing, a polygonal connection, a keyed connection, an elastic bolt coupling, and an internal clamping set.

8. The drive system of claim 1, wherein the stub shaft is sized to extend axially entirely beyond the rotor hollow shaft, and further comprising a coupling or clamping connection arranged at an end side of the motor or generator unit facing away from the transmission unit and configured to connect the stub shaft to the rotor hollow shaft.

9. The drive system of claim 1, wherein the coupling or clamping connection is a member selected from the group consisting of a short toothed coupling, spiral toothing, a polygonal connection, a keyed connection, a flange connection, an elastic bolt coupling, and an internal or external clamping set.

10. The drive system of claim 1, further comprising a braking device having a brake disk, said rotor hollow shaft being non-rotatably connected at an end side of the motor or generator unit facing away from the transmission unit to the brake disk of the braking device.

11. The drive system of claim 10, further comprising a disk-shaped flange and elastic bolts to connect the disk-shaped flange to the brake disk, said stub shaft being connected at an end side of the motor or generator unit facing away from the transmission unit to the disk-shaped flange.

12. The drive system of claim 1, further comprising a braking device having a brake disk, said second shaft of the transmission unit being non-rotatably connected to the brake disk of the braking device.

13. The drive system of claim 12, further comprising a keyed or clamping connection configured to connect the brake disk to the second shaft, said keyed or clamping connection being axially aligned with a short toothed coupling between the second shaft and the sun wheel shaft.

14. The drive system of claim 1, further comprising a double-row mounting an X arrangement to support the second shaft of the transmission unit.

15. The drive system of claim 1, wherein one of the housing covers for providing the bearing seating for the first bearing of the rotor hollow shaft faces toward the transmission unit on a first motor or generator end side, and the other one of the housing covers for providing the bearing seating for the second bearing of the rotor hollow faces away from the transmission unit at a second motor or generator end side.

16. The drive system of claim 1, wherein the rotor hollow shaft is axially separated from the second shaft of the transmission unit or arranged axially adjacent to the second shaft of the transmission unit.

17. The drive system of claim 1, wherein the transmission housing connecting piece is arranged in concentric surrounding relationship to a motor-side or generator-side end section of the sun wheel shaft.

18. The drive system of claim 1, wherein the first shaft of the transmission unit includes a coupling flange configured for elastic connection to the driven machine shaft or rotor shaft, and further comprising a transmission housing having a cardanic peripherally symmetrical or partially symmetrical mounting for connection to a supporting structural element of the wind turbine.

19. The drive system of claim 18, wherein the cardanic mounting is formed by a ring-shaped mount radially surrounding a whole periphery of the transmission housing, said mount having a plurality of bores arranged in a peripheral direction in a substantially equidistant relationship and receiving elastic bolts which are connectable with a corresponding torque mount to a supporting structural element of the wind turbine.

20. The drive system of claim 19, wherein the torque mount includes a ring element with bores arranged substantially equidistantly in the peripheral direction for insertion of elastic bolts.

21. The drive system of claim 19, wherein the torque mount has two symmetrically or asymmetrically formed mounting arms, each said mounting arm having an end section for insertion into a receptacle on the supporting structural element and connection to the supporting structural element.

22. The drive system of claim 18, wherein the cardanic mounting is formed by two ring-shaped mounts radially surrounding part of a periphery of the transmission housing, said mounts having a plurality of bores arranged in a peripheral direction in substantially equidistant relationship for insertion of elastic bolts which are connectable with corresponding torque mounts to the supporting structural element of the wind turbine.

23. The drive system of claim 22, wherein each of the torque mounts has a ring segment with bores arranged in the peripheral direction substantially equidistantly for insertion of the elastic bolts.

24. The drive system of claim 22, wherein each of the torque mounts has a mounting arm having an end section for insertion into a receptacle on the supporting structural element, said mounting arms being connectable structural element.

25. The drive system of claim 19, wherein the elastic bolts of the cardanic mounting are axially removable elastomer bolts, said coupling flange having a plurality of bores arranged in a peripheral direction in substantially equidistant relationship for insertion of the axially removable elastic bolts which are connectable to a corresponding driven machine or rotor shaft coupling flange.

26. The drive system of claim 25, wherein a radial assembly or disassembly direction of the drive system is cleared in relation to a shaft arrangement of the transmission unit, when the elastomer bolts of the cardanic mounting and the coupling flange are removed.

27. The drive system of claim 18, wherein the transmission unit has an additional assembly which is mounted directly onto the supporting structural element of the wind turbine and decoupled from the transmission housing via the cardanic mounting and an elastic coupling between the driven machine shaft or the rotor shaft and the first shaft of the transmission unit.

28. The drive system of claim 18, wherein the transmission unit comprises first and second main bearings for support of the first shaft of the transmission unit, said first and second main bearings of the transmission unit being arranged between the planet support and the transmission housing.

29. The drive system of claim 18, wherein the transmission unit comprising a first and second planetary gear stages in a coaxial arrangement.

30. The drive system of claim 1, wherein the transmission unit has a motor-side or generator-side bearing configured electrically isolated.

31. The drive system of claim 1, wherein the transmission unit is connected to a generator unit, said first shaft of the transmission unit being a transmission-side drive shaft, said second shaft of the generator unit being a transmission-side output shaft, and said coupling flange of the transmission-side drive shaft being connectable to a rotor shaft.

* * * * *